(12) United States Patent
Achilles et al.

(10) Patent No.: US 12,215,670 B2
(45) Date of Patent: Feb. 4, 2025

(54) SYSTEM AND METHOD FOR ADJUSTING REACTIVE POWER RESPONSE OF ONE OR MORE WIND TURBINES OF A WIND FARM DURING A COMMUNICATIONS FAULT

(71) Applicant: General Electric Renovables Espana, S.L., Barcelona (ES)

(72) Inventors: Alfredo Sebastian Achilles, Niskayuna, NY (US); Fernando Arturo Ramirez Sanchez, Salem, VA (US); Andreu Casal Vilana, Barcelona (ES); Igor Berroteran, Salem, VA (US)

(73) Assignee: General Electric Renovables Espana, S.L., Barcelona (ES)

( * ) Notice: Subject to any disclaimer, the term of this patent is extended or adjusted under 35 U.S.C. 154(b) by 472 days.

(21) Appl. No.: 17/719,669

(22) Filed: Apr. 13, 2022

(65) Prior Publication Data
US 2022/0333575 A1   Oct. 20, 2022

(30) Foreign Application Priority Data

Apr. 15, 2021   (EP) ..................................... 21382321

(51) Int. Cl.
*F03D 7/02*   (2006.01)
*F03D 7/04*   (2006.01)

(52) U.S. Cl.
CPC ........... *F03D 7/0264* (2013.01); *F03D 7/028* (2013.01); *F03D 7/048* (2013.01);
(Continued)

(58) Field of Classification Search
CPC ......... F03D 7/0264; F03D 7/028; F03D 7/048
See application file for complete search history.

(56) References Cited

U.S. PATENT DOCUMENTS

| 9,344,025 B2 | 5/2016 | Bluhm et al. |
| 10,042,374 B2 | 8/2018 | Nelson et al. |

(Continued)

FOREIGN PATENT DOCUMENTS

| CN | 107994588 A | 5/2018 |
| CN | 107732973 B | 5/2020 |

(Continued)

OTHER PUBLICATIONS

European Search Report Corresponding to EP21382321 on Sep. 24, 2021.

*Primary Examiner* — Mark A Connolly
(74) *Attorney, Agent, or Firm* — Dority & Manning, P.A.

(57) ABSTRACT

A method includes receiving, via one or more turbine-level controllers, an indication of at least one of a communication loss between the one or more turbine-level controllers and a farm-level controller, a detection of an absence of reactive power regulation by the farm-level controller, or a reactive power command of the farm-level controller being equal to or above a saturation threshold during transitioning between a baseline operational mode and reactive power mode, the reactive power mode being characterized in that only reactive power is generate. Upon receipt of the indication, the method includes adjusting a reactive power response of one or more reactive power regulators of the one or more turbine-level controllers so as to avoid an overshoot reactive power event or an undershoot reactive power event at the point of interconnection.

20 Claims, 6 Drawing Sheets

402 RECEIVE, VIA ONE OR MORE OF THE TURBINE-LEVEL CONTROLLERS, AN INDICATION OF AT LEAST ONE OF A COMMUNICATION LOSS BETWEEN THE TURBINE-LEVEL CONTROLLERS AND THE FARM-LEVEL CONTROLLER, A DETECTION OF AN ABSENCE OF REACTIVE POWER REGULATION BY THE FARM-LEVEL CONTROLLER, OR A REACTIVE POWER COMMAND OF THE FARM-LEVEL CONTROLLER BEING EQUAL TO OR ABOVE A SATURATION THRESHOLD DURING TRANSITIONING BETWEEN A BASELINE OPERATIONAL MODE AND A REACTIVE POWER MODE, THE REACTIVE POWER MODE BEING CHARACTERIZED IN THAT ONLY REACTIVE POWER IS GENERATED

404 UPON RECEIPT OF THE INDICATION, ADJUST A REACTIVE POWER RESPONSE OF ONE OR MORE REACTIVE POWER REGULATORS OF THE TURBINE-LEVEL CONTROLLERS SO AS TO AVOID AN OVERSHOOT REACTIVE POWER EVENT OR AN UNDERSHOOT REACTIVE POWER EVENT AT THE POINT OF INTERCONNECTION

(52) U.S. Cl.
CPC ... *F05B 2260/80* (2013.01); *F05B 2270/1033* (2013.01); *F05B 2270/107* (2013.01); *F05B 2270/335* (2013.01); *F05B 2270/402* (2013.01); *F05B 2270/502* (2013.01); *F05B 2270/70* (2013.01)

(56) References Cited

U.S. PATENT DOCUMENTS

| | | |
|---|---|---|
| 10,923,918 B2 | 2/2021 | Garcia et al. |
| 2014/0307488 A1 | 10/2014 | Brogan et al. |
| 2014/0375052 A1 | 12/2014 | Nielsen |
| 2015/0076824 A1* | 3/2015 | Kumar .................. H02J 3/381 290/44 |
| 2019/0170117 A1 | 6/2019 | Letas |
| 2020/0083829 A1 | 3/2020 | Kruse |
| 2021/0047997 A1 | 2/2021 | Abeyasekera |
| 2022/0094167 A1* | 3/2022 | Beekmann ............... H02J 3/48 |

FOREIGN PATENT DOCUMENTS

| | | |
|---|---|---|
| EP | 3399620 A1 | 11/2018 |
| JP | 2017200275 A | 11/2017 |
| WO | WO2017174085 A1 | 10/2017 |

* cited by examiner

SYSTEM AND METHOD FOR ADJUSTING REACTIVE POWER RESPONSE OF ONE OR MORE WIND TURBINES OF A WIND FARM DURING A COMMUNICATIONS FAULT

FIELD

The present disclosure relates generally to systems and methods for controlling wind farms having one or more wind turbines, and more particularly, to systems and methods for adjusting a reactive power response of one or more wind turbines in the wind farm to provide smooth transitions during a communications fault, when the reactive power control functionality is disabled by the farm-level controller, and/or during transitioning between baseline and reactive power modes while the reactive power command is saturated.

BACKGROUND

Wind power is considered one of the cleanest, most environmentally friendly energy sources presently available, and wind turbines have gained increased attention in this regard. Existing electrical power distribution systems (e.g., electrical grids) can be utilized for distributing power from renewable energy sources, such as wind, if control systems and methodologies are utilized to coordinate power produced by the renewable energy sources, the power demand on the power distribution systems and the power consumed based on the varying operational states that are inherent with respect to renewable energy sources. For example, the operational state of a wind turbine can vary based on wind speeds or the absence of wind.

Wind power does not always have a constant power output, but can include variations; therefore, operators of power distribution systems have to take this into account. One of the consequences is, for example, that the distribution and transmission networks have become more difficult to manage. This pertains also to the management of resonance in a power distribution system, including wind turbines. Like conventional power plants, wind power plants or wind farms should be managed or controlled to provide electrical grids with power that is stable (e.g., with constant voltage and frequency, minimum disturbances, and low harmonics emission) to ensure reliability and proper delivery of power.

As such, modern wind farms have a farm-level controller communicatively coupled to turbine-level controllers of each of the wind turbines in the wind farm. More specifically, the farm-level controller manages each of the individual turbine-level controllers to achieve desired active and reactive power outputs. Further, to achieve a fast reactive power response, the power control loops between the farm-level controller and the turbine-level controllers are tuned to account for each other's response time. This is worsened when the power converter configurations in the wind farm are connected to a weak grid. As such, the farm-level controller generally includes an aggressive setting of the reactive power feed-forward function. This function is typically used in applications with fast farm-level voltage regulation requirements.

However, if communications between the farm-level controller and one or more of the turbine-level controllers are lost, or if the farm-level controller reactive power regulation functionality is disabled, the corresponding wind turbines are configured to operate under an "autonomous mode". Thus, the turbine-level control loops are no longer coupled to the farm-level controller. As a result, reactive power overshoot/undershoot events can occur at the point of common coupling (e.g., the turbine output), either when reference changes or when transitioning back and forth between conventional and reactive power only modes. Moreover, after communication recovery, a saturation at the farm-level during the transitioning back and forth between conventional and reactive power only modes, the controller can lead to the same reactive power undershoot/overshoot response.

In view of the foregoing, a system and method for adjusting a reactive power response of the wind farm to provide smooth transitions during a communications fault, when the reactive power control functionality is disabled by the farm-level controller, and/or during transitioning between baseline and reactive power modes while the reactive power command is saturated would be welcomed in the art.

BRIEF DESCRIPTION

Aspects and advantages of the invention will be set forth in part in the following description, or may be obvious from the description, or may be learned through practice of example embodiments of the present disclosure.

In an aspect, the present disclosure is directed to a method for controlling a wind farm having a plurality of wind turbines electrically connected to an electrical grid at a point of interconnection. The wind farm is controlled by a farm-level controller. Further, each of the plurality of wind turbines has a turbine-level controller communicatively coupled to the farm-level controller. The method includes receiving, via one or more of the turbine-level controllers, an indication of at least one of a communication loss between one or more of the turbine-level controllers and the farm-level controller, a detection of an absence of reactive power regulation by the farm-level controller, or a reactive power command of the farm-level controller being equal to or above a saturation threshold during transitioning between a baseline operational mode and reactive power mode, the reactive power mode being characterized in that only reactive power is generate. Upon receipt of the indication, the method includes adjusting a reactive power response of one or more reactive power regulators of one or more of the turbine-level controllers so as to avoid an overshoot reactive power event or an undershoot reactive power event at the point of interconnection.

In an embodiment, adjusting the reactive power response of one or more reactive power regulators of one or more of the turbine-level controllers may include adjusting gain(s) of the reactive power regulator(s) and/or disabling a feed-forward function of the one or more reactive power regulators. In such embodiments, disabling the feed-forward function of the one or more reactive power regulators may include generating, via one or more of the turbine-level controllers, a disable signal for one or more converter controllers of the plurality of wind turbines to disable the feed-forward function and sending, via one or more of the turbine-level controllers, the disable signal to the one or more converter controllers to disable the feed-forward function.

In particular embodiments, the disable signal instructs the converter controller(s) to slow down a reactive power response thereof by disabling a feed-forward branch of the one or more reactive power regulators, effectively providing a smooth reactive power response.

In further embodiments, the disable signal may be a Boolean signal. In such embodiments, the method may include, upon receipt of the indication, setting the Boolean signal to set to a true status, wherein before receiving the indication, the Boolean signal is set to a false status. In additional embodiments, the Boolean signal remains set to the true status for a predetermined time limit before automatically resetting to the false status. For example, in such embodiments, the predetermined time limit is less than about 100 seconds.

In several embodiments, the method may also include determining the communication loss by observing one or more reference communication updates via one or more of the turbine-level controllers. In another embodiment, the method may include determining if the reactive power regulation in the farm-level controller is disabled by observing the validity of the reactive power command sent by the farm-level controller. Moreover, in an embodiment, the method may include determining whether the reactive power command of the farm-level controller is equal to or above the saturation threshold by comparing, via the turbine-level controller(s), the reactive power command of the farm-level controller to a maximum available reactive power at one of the plurality of wind turbines.

In an embodiment, the method may include enabling, via one or more of the turbine-level controllers, the feed-forward function of the reactive power regulator(s) after at least one of the communication loss is restored, the reactive power regulation in the farm-level controller is enabled, or the reactive power command is less than the saturation threshold during transitioning between the baseline operational mode and the reactive power mode.

In another aspect, the present disclosure is directed to a system for controlling a wind farm having a plurality of wind turbines electrically connected to an electrical grid at a point of interconnection. The system includes a farm-level controller and a plurality of turbine-level controllers communicatively coupled to the farm-level controller. Each of the plurality of turbine-level controllers includes at least one processor. The processor(s) is configured to perform operations, including but not limited to receiving, via one or more of the plurality of turbine-level controllers, an indication of at least one of a communication loss between one or more of the plurality of turbine-level controllers and the farm-level controller, a detection of an absence of reactive power regulation by the farm-level controller, or a reactive power command of the farm-level controller being equal to or above a saturation threshold during transitioning between a baseline operational mode and reactive power mode, the reactive power mode being characterized in that only reactive power is generate, adjusting a reactive power response of one or more reactive power regulators of one or more of the plurality of turbine-level controllers so as to avoid an overshoot reactive power event or an undershoot reactive power event at the point of interconnection. It should be understood that the system may further include any of the additional features described herein.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
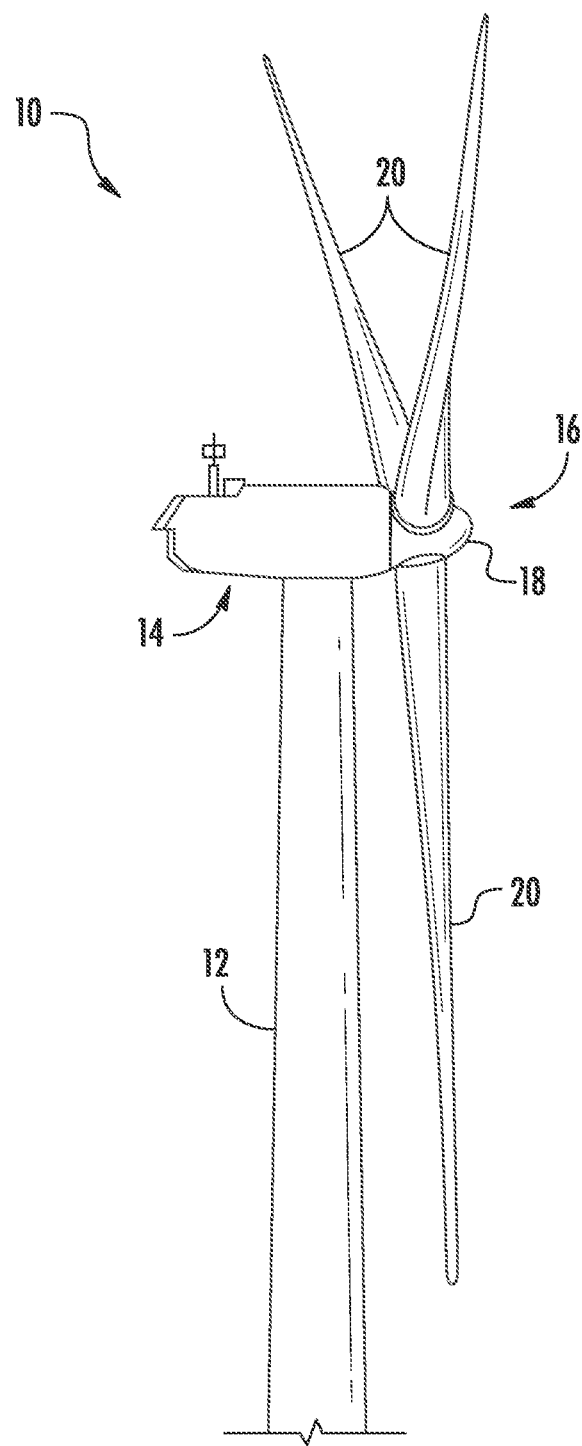
FIG. 1 illustrates a perspective view of a portion of a wind turbine according to example embodiments of the present disclosure.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Generally, the present disclosure is directed to systems and methods for adjusting a reactive power response of a wind farm to provide smooth transitions during a communications fault. In particular, the present disclosure provides adjustment of the reactive power regulator response of one or more turbine-level controllers when the farm-level controller output is either saturated or lost due to a communications failure. In an embodiment, for example, the response change may be achieved by adjusting gain(s) of the power regulator or disabling the power converter reactive power regulator feed-forward term during these conditions, e.g., to slow-down the turbine response and avoid presence of overshoot and undershoot conditions. The detection of these specific scenarios is completed by the turbine-level controller(s). Upon detection of these scenarios, the turbine-level controller(s) are configured to send a command to the power converter(s) to disable the reactive power regulator feed-forward term. In addition, when the wind turbine(s) recovers from these situations, the turbine-level controller(s) are configured to send the command to re-enable the feed-forward term.

Referring now to the figures, FIG. 1 depicts a perspective view of one embodiment of a wind turbine 10 according to the present disclosure. As shown, the wind turbine 10 generally includes a tower 12 extending from a support surface (not shown), a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator 28 (FIG. 2) positioned within the nacelle 14 to permit electrical energy to be produced.

Figure 2:
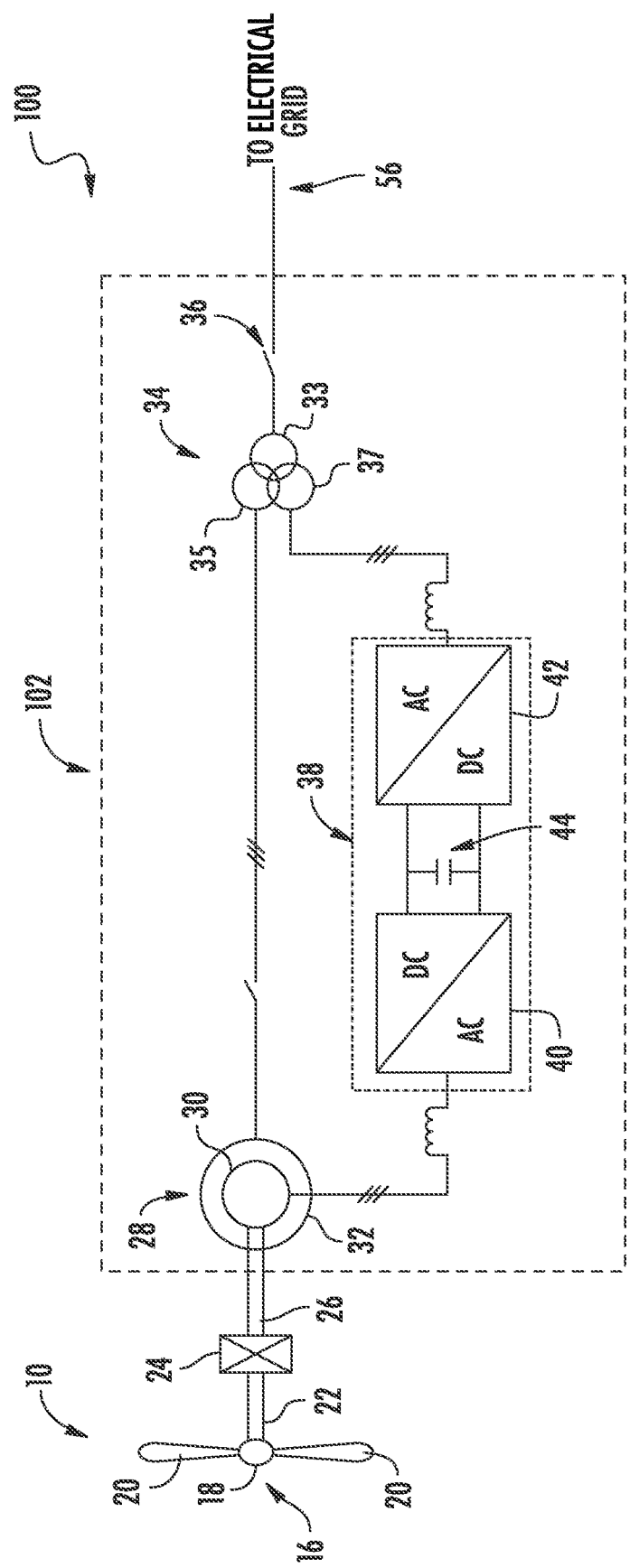
FIG. 2 illustrates a schematic diagram of a wind turbine electrical power system according to example embodiments of the present disclosure which is suitable for use with the wind turbine shown in FIG. 1.

Referring now to FIG. 2, a wind turbine power system 100, which includes the wind turbine 10 and associated power system 102, is illustrated. As wind impacts the rotor blades 20, the blades 20 transform wind energy into a mechanical rotational torque that rotatably drives a low-speed shaft 22. The low-speed shaft 22 is configured to drive a gearbox 24 (where present) that subsequently steps up the low rotational speed of the low-speed shaft 22 to drive a high-speed shaft 26 at an increased rotational speed. The high-speed shaft 26 is generally rotatably coupled to a generator 28 (such as a doubly-fed induction generator or DFIG) so as to rotatably drive a generator rotor 30. As such, a rotating magnetic field may be induced by the generator rotor 30 and a voltage may be induced within a generator stator 32 that is magnetically coupled to the generator rotor 30. The associated electrical power can be transmitted from the generator stator 32 to a main three-winding transformer 34 that is connected to an electrical grid at a point of interconnection (POI) 56 via a grid breaker 36. Thus, the main transformer 34 steps up the voltage amplitude of the electrical power such that the transformed electrical power may be further transmitted to the electrical grid.

In addition, as shown, the generator 28 may be electrically coupled to a bi-directional power converter 38 that includes a rotor-side converter 40 joined to a line-side converter 42 via a regulated DC link 44. The rotor-side converter 40 converts the AC power provided from the generator rotor 30 into DC power and provides the DC power to the DC link 44. The line side converter 42 converts the DC power on the DC link 44 into AC output power suitable for the electrical grid. Thus, the AC power from the power converter 38 can be combined with the power from the generator stator 32 to provide multi-phase power (e.g., three-phase power) having a frequency maintained substantially at the frequency of the electrical grid (e.g., 50 Hz/60 Hz).

Figure 3:
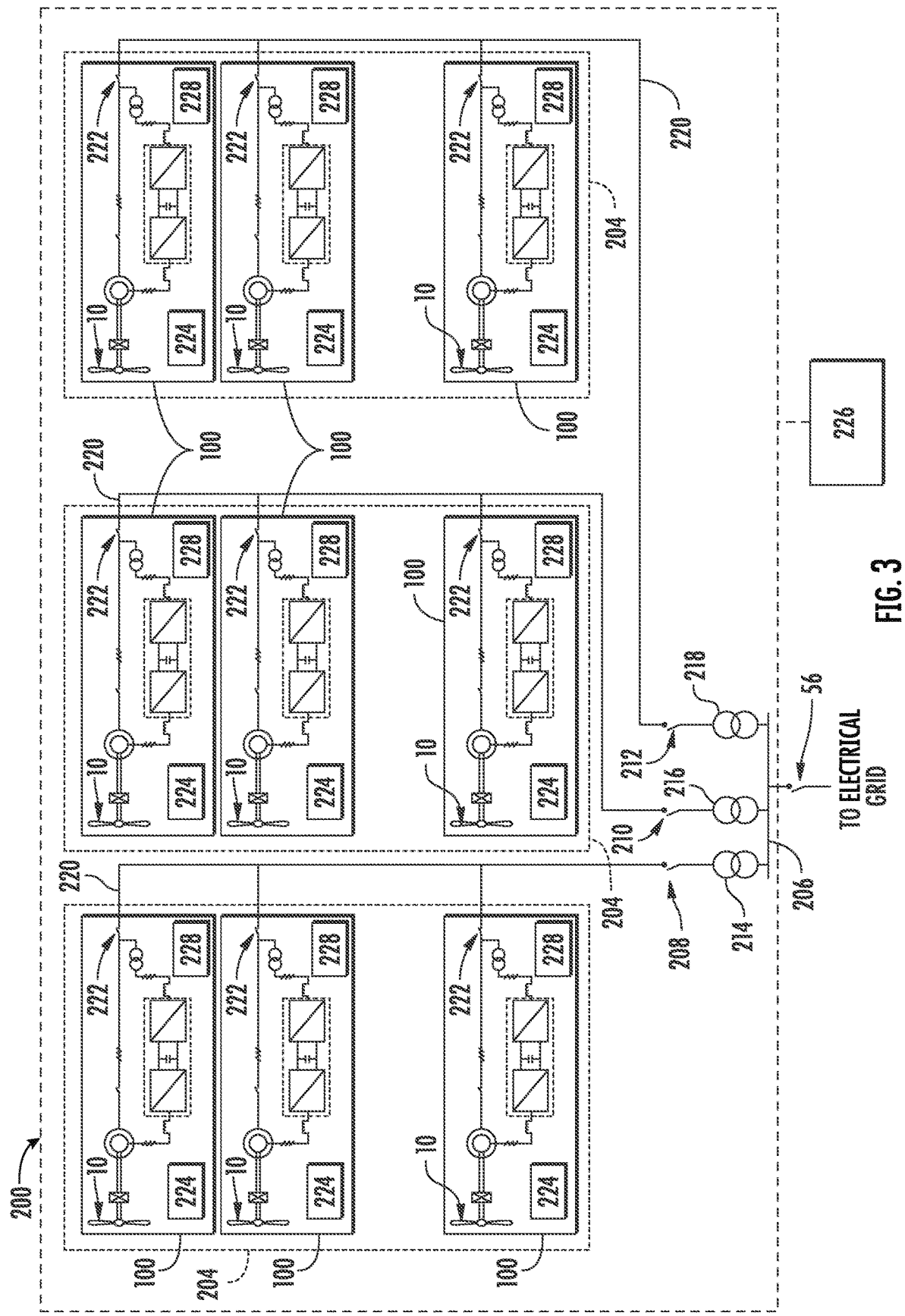
FIG. 3 illustrates a schematic diagram of a wind farm electrical power system according to example embodiments of the present disclosure.

In some configurations power system 102 can include a turbine level controller 224 (shown in FIG. 3). The turbine level controller 224 can be a control, such as the controller shown and described in FIG. 4.

The illustrated three-winding transformer 34 can have (1) a 33 kilovolt (kV) medium voltage (MV) primary winding 33 connected to the electrical grid, (2) a 6 to 13.8 kV MV secondary winding 35 connected to the generator stator 32, and (3) a 690 to 900 volt (V) low-voltage (LV) tertiary winding 37 connected to the line-side power converter 42.

Referring particularly to FIG. 3, a schematic diagram of one embodiment of a wind farm 200 according to the present disclosure is illustrated. More specifically, as shown, the wind farm 200 can include a plurality of wind turbines 10 connected to an electrical grid via a POI 56. In one embodiments, the wind farm 200 may include a plurality of clusters 204 of wind turbines 10. Thus, the wind turbine power systems 100 including the wind turbines 10 may be arranged in predetermined geographic locations and electrically connected together to form the wind farm 200.

The electrical power associated with each wind turbine power system 100 can be transmitted to a main line 206 via one or more cluster lines 220. Each wind turbine power system 100 can be connected or disconnected to the one or more cluster lines 220 via one or more switches 222 or breakers. Further, as shown, each cluster 204 of wind turbines 10 may be connected to a separate transformer 214, 216, 218 via switches 208, 210, 212, respectively, for stepping up the voltage amplitude of the electrical power from each cluster 204 such that the transformed electrical power may be further transmitted to the electrical grid. In addition, as shown, the transformers 214, 216, 218 may be connected to a main line 206 that combines the voltage from each cluster 204 before sending the power to the grid via a POI 56. The POI 56 can be a breaker, switch, or other known method of connection to an electrical grid.

Each wind turbine power system 100 can include a turbine-level controller 224 and a voltage regulator 228 (i.e., a wind turbine terminal voltage regulator). As such, the voltage regulator 228 regulates the voltage which is output by each wind turbine power system 100. Further, the voltage regulator 228 can be part of or in electrical communication with the turbine-level controller 224 or a farm-level controller 226. Thus, the turbine-level controller(s) 224 and/or the farm-level controller 226 can deliver a voltage regulator gain command ($V_{CMD}$) to one or more of the voltage regulators 228 which in turn dictates the amount of power distributed to the POI 56 via cluster lines 220.

As described herein, the turbine-level controller(s) 224 can be configured to control the components of the respective wind turbine power systems 100, including switches 222 or voltage regulator 228, and/or implement some or all the method steps as described herein. The turbine-level controller(s) 224 can be located on or within each wind turbine 10 or can be located remotely from each wind turbine 10. The turbine-level controller(s) 224 can be part of or included with one or more of the other controllers associated with wind turbine power system 100 and/or the wind farm 200.

Similarly, the wind farm 200 can include one or more controllers, such as the farm-level controller 226. The farm-level controller 226 can be configured to control the components of the wind farm 200, including switches 208, 210 and 212, voltage regulators 228, communicate with one or more other controllers, such as the turbine-level controllers 224, and/or implement some or all the method steps as described herein. The farm-level controller 226 can be located within the geographic area of the wind farm 200, or any portion thereof, or can be located remotely from the wind farm 200, or any portion thereof. The farm-level controller 226 can be part of or included with one or more of the other controllers associated with one or more of the wind turbine power systems 100 and/or the wind farm 200. Each of the clusters 204, wind turbine power systems 100, or turbine-level controllers 224, may be communicatively coupled with the farm-level controller 226.

The farm-level controller 226 can generate and send control signals to turbine-level controller 224 to operate switches 222 to connect or disconnect the one or more wind turbine power systems 100 from the cluster lines 220 based at least in part on the power required at the POI 56. The farm-level controller 226 can generate and send control signals to voltage regulators 228 to operate or control the voltage regulators 228 and control the amount of power delivered to the POI 56 from the wind turbine power system(s) 100 through the cluster lines 220 based at least in part on the power required at the POI 56.

In further embodiments, the farm-level controller 226 can generate and send control signals to switches 208, 210 and/or 212 and/or voltage regulators 228 to regulate the power delivered to the POI 56, based at least in part on the power required at the POI 56, and/or based, at least in part, on characteristics of the wind turbine power system(s) 100, the wind farm 200, and/or characteristics of the wind turbines 10.

Figure 4:
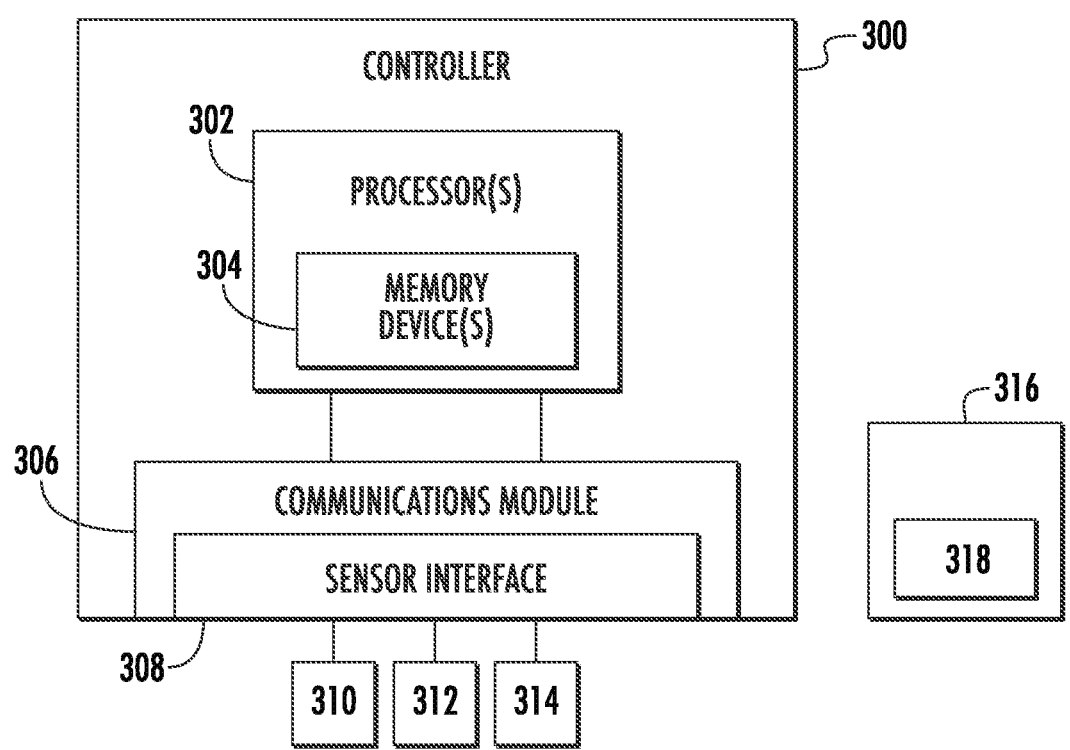
FIG. 4 illustrates a block diagram of a controller according to example embodiments of the present disclosure.

Referring now to FIG. 4, a block diagram of a controller 300 according to example embodiments of the present disclosure is illustrated. As shown, the controller 300 can be the turbine-level controller 224 or the farm-level controller 226. Further, as shown, the controller 300 can include one or more processor(s) 402 and associated memory device(s) 304 configured to perform a variety of computer-implemented functions (e.g., performing the methods, steps, calculations and the like and storing relevant data as disclosed herein). The memory device 304 may also store date relevant to certain characteristics of the wind turbine power system(s) 100, the wind farm 200, and/or characteristics of the wind turbines 10.

Additionally, the controller 300 may include a communications module 306 to facilitate communications between the controller and the various components of the wind turbine power system(s) 100, the wind farm 200 and/or the farm-level controller 226, including communication between the farm-level controller 226 and the turbine-level controller(s) 224. Further, the communications module 306 may include a sensor interface 308 (e.g., one or more analog-to-digital converters) to permit signals transmitted from one or more sensors 310, 312 and 314 to be converted into signals that can be understood and processed by the processors 402. Thus, in an embodiment, the sensors 310, 312 and 314 can be used to measure, ascertain, or gather data regarding characteristics of the wind turbine power system(s) 100, the wind farm 200, and/or characteristics of the wind turbines 10.

Still referring to FIG. 4, the controller 300 can also include a user interface 316. The user interface 316 can have various configurations and controls can be mounted or in user interface 316. The user interface 316 can also be located within the geographic area of the wind farm 200, or any portion thereof, or can be located remotely from the wind farm 200, or any portion thereof. The user interface 316 may also include an input component 318. In an embodiment, the input component 318 can be, for instance, a capacitive touch screen. In such embodiments, the input component 318 can allow for the selective activation, adjustment, or control of the farm-level controller 226 and/or the turbine-level controller(s) 224, as well as any timer features or other user adjustable inputs. One or more of a variety of electrical, mechanical, or electro-mechanical input devices, including rotary dials, push buttons, and touch pads, can also be used singularly or in combination as input component 318. In another embodiment, the user interface 316 can include a display component, such as a digital or analog display device designed to provide operation feedback to a user.

It should be appreciated that the sensors 310, 312 and 314 may be communicatively coupled to the communications module 306 using any suitable means. For example, the sensors 310, 312 and 314 may be coupled to the sensor interface 308 via a wired connection. However, in other embodiments, the sensors 310, 312 and 314 may be coupled to the sensor interface 308 via a wireless connection, such as by using any suitable wireless communications protocol known in the art. As such, the processor 402 may be configured to receive one or more signals from the sensors 310, 312 and 314. In further embodiments, the sensors 310, 312 and 314 can be part of or included with one or more of the other controllers associated with one or more of the wind turbine power systems 100 and/or the wind farm 200. Moreover, in an embodiment, the sensors 310, 312 and 314 can also be located within the geographic area of the wind farm 200, or any portion thereof, or can be located remotely from the wind farm 200, or any portion thereof.

It should also be understood that sensors 310, 312 and 314 can be any number or type of voltage and/or electric current sensors may be employed within the wind turbine power systems 100 and at any location. For example, the sensors may be current transformers, shunt sensors, Rogowski coils, Hall Effect current sensors, Micro Inertial Measurement Units (MIMUs), or similar, and/or any other suitable voltage or electric current sensors now known or later developed in the art. Thus, the one or more controllers, such as wind farm controller 226 and turbine-level controller(s) 224, are configured to receive one or more voltage and/or electric current feedback signals from the sensors 310, 312 and 314.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor(s) 402 is also configured to compute advanced control algorithms and communicate to a variety of Ethernet or serial-based protocols (Modbus, OPC, CAN, etc.). Additionally, the memory device(s) 304 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 140 may generally be configured to store suitable computer-readable instructions that, when implemented by the processor(s) 402, configure the controller to perform the various functions as described herein.

Figure 5:
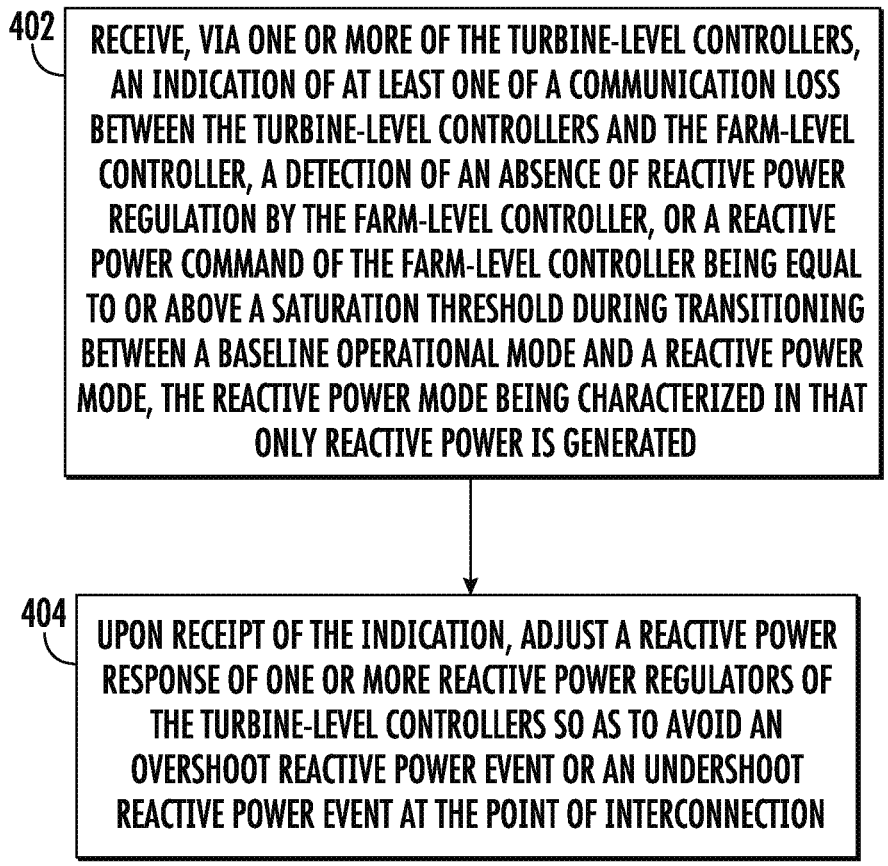
FIG. 5 illustrates a flow diagram of one embodiment of a method for controlling a wind farm according to the present disclosure.
Figure 6:
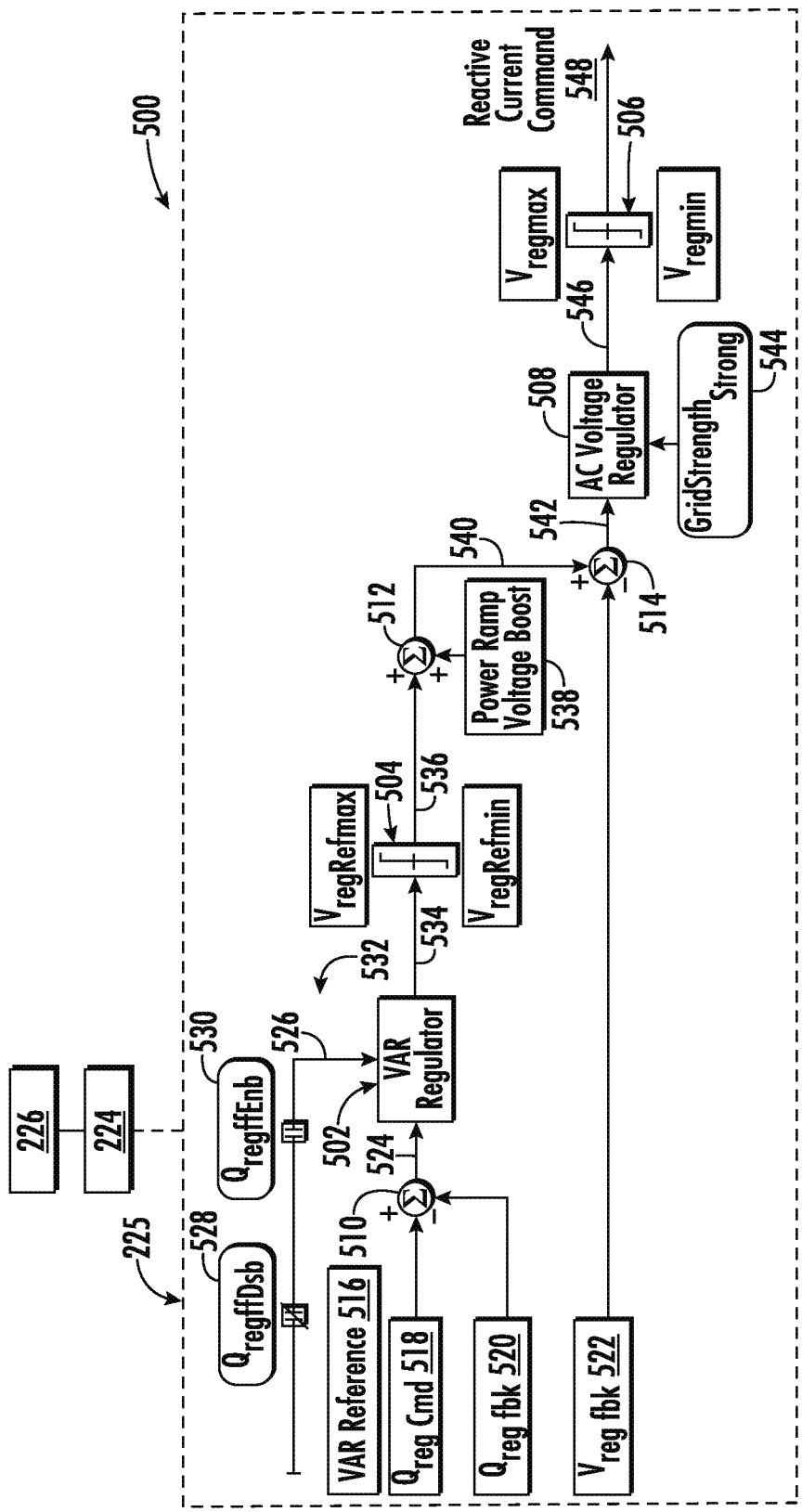
FIG. 6 illustrates a schematic diagram of one embodiment of a system for controlling a wind farm according to the present disclosure.

Referring now to FIGS. 5 and 6, a method 400 and system 500 for controlling a wind farm having a plurality of wind turbines electrically connected to an electrical grid at a point of interconnection according to the present disclosure are illustrated, respectively. More specifically, FIG. 5 illustrates a flow chart of one embodiment of the method 400 controlling a wind farm according to the present disclosure, whereas FIG. 6 illustrates a schematic diagram of one embodiment of a system 500 for controlling a wind farm according to the present disclosure. In general, the method 400 and system 500 will be described herein with reference to the wind turbine 10, the wind turbine power system 100, the wind farm 200, and the various controllers illustrated in FIGS. 1-4. However, it should be appreciated that the disclosed method 400 and system 500 may be implemented with wind turbines and wind farms having any other suitable configurations.

In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring particularly to FIG. 5, as shown at (402), the method 400 includes receiving, via one or more of the turbine-level controllers 224, an indication of a communication loss between one or more of the turbine-level controllers 224 and the farm-level controller 226, a detection of an absence of reactive power regulation by the farm-level controller 226, and/or a reactive power command of the farm-level controller 226 being equal to or above a saturation threshold during transitioning between (e.g., back and forth) a baseline operational mode and a reactive power mode. As used herein, the reactive power mode may be characterized in that only reactive power is generated during this mode. Thus, in several embodiments, the method 400 may include determining the communication loss by observing one or more reference communication updates via one or more of the turbine-level controllers 224. In another embodiment, the method 400 may include determining if the reactive power regulation in the farm-level controller 226 is disabled or enabled by observing a validity of a reactive power command sent by the farm-level controller 226. Moreover, in an embodiment, the method 400 may include determining whether the reactive power command of the farm-level controller 226 is equal to or above the saturation threshold by comparing, via the turbine-level controller(s) 224, the reactive power command of the farm-level controller 226 to a maximum available reactive power.

Upon receipt of the indication, as shown at (404), the method 400 includes adjusting a reactive power response of one or more reactive power regulators of one or more of the turbine-level controllers 224 so as to avoid an overshoot reactive power event or an undershoot reactive power event at the POI 56.

Referring now to FIG. 6, a control diagram of the system 500 for controlling the wind farm 200 according to the present disclosure is illustrated to further illustrate details of the method 400 described herein. More particularly, as shown, the system 500 may generally include the farm-level controller 226 and the turbine-level controllers 224 each having a converter controller 225 for controlling the power converter 38 (only one of which is illustrated). Thus, as shown, the converter controller(s) 225 described herein each include a reactive power regulator configuration as shown. In particular, each of the converter controller(s) 225 may include a reactive power regulator 502, one or more limiters 504, 506, an active current (AC) voltage regulator 508, and various comparators 510, 512, 514. Thus, as shown, the converter controller(s) 225 receives a reactive power (VAR) reference 516, a reactive power command 518, and various feedback signals (e.g., a reactive power feedback signal 520 and a voltage feedback signal 522. Further, as shown, the comparator 510 is configured to compare the reactive power reference 516, the reactive power command 518, and the reactive power feedback signal 520. Output 524 is then used by the reactive power regulator 502 along with a reactive power feed-forward function 526, which can be enabled or disabled via various switches as shown.

Thus, in an embodiment, adjusting the reactive power response of the reactive power regulator(s) 502 may include adjusting gain(s) of the reactive power regulator(s) 502 or disabling a feed-forward function 526 of the reactive power regulator(s) 502 of the converter controller(s) 225. For example, in such embodiments, as shown, disabling the feed-forward function 526 may include generating a disable signal 528 (e.g., QregffDsb) by the turbine-level controller 224 and sending the disable signal 528 to the converter controller(s) 225 to disable the feed-forward function 526 therein. Thus, in particular embodiments, the disable signal 528 instructs the converter controller(s) 225 to slow down a reactive power response thereof by disabling a feed-forward branch 532 of the reactive power regulator(s) 502, effectively providing a smooth reactive power response.

In additional embodiments, as shown, the converter controller(s) 225 is further configured to enable the feed-forward function 526 of the reactive power regulator(s) 502 after the communication loss is restored and/or the reactive power command is less than the saturation threshold. For example, in an embodiment, the converter controller(s) 225 is further configured to enable the feed-forward function 526 by generating an enable signal 530 (e.g., QregffEnb) and sending the enable signal 530 to the reactive power regulator(s) 502.

In particular embodiments, for example, the disable and enable signals 528, 530 may be Boolean signals. In such embodiments, upon receipt of the indication relating to the communication loss and/or the farm-level controller 226 being saturated, the system 500 is configured to set the Boolean signal to set to a true status, wherein before receiving the indication, the Boolean signal is set to a false status. In additional embodiments, the Boolean signal remains set to the true status for a predetermined time limit before automatically resetting to the false status. For example, in such embodiments, the predetermined time limit is less than about 100 seconds.

Thus, referring still to FIG. 6, the reactive power regulator(s) 502 is configured to generate an output 534 that can be limited via limiter 504 having a defined maximum and minimum (e.g., VregRefmax and VregRefmin). The output 536 from the limiter 504 may then be compared to a power ramp voltage boost value 538 via the comparator 512 to generate a voltage command 540. Thus, as shown, the voltage command 540 can be compared to the voltage feedback signal 522 via the comparator 514. The output 542 from the comparator 514 can then be used by the AC voltage regulator 508 along with a grid strength signal 544. As such, the output 546 from the AC voltage regulator 508 may also be limited via the limiter 506 having a defined maximum and minimum (e.g., Vregmax and Vregmin). Accordingly, the output from the limiter 506 corresponds to the reactive current command 548 for the power converter 38.

Various aspects and embodiments of the present invention are defined by the following numbered clauses:

Clause 1. A method for controlling a wind farm having a plurality of wind turbines electrically connected to an electrical grid at a point of interconnection, the wind farm being controlled by a farm-level controller, each of the plurality of wind turbines having a turbine-level controller communicatively coupled to the farm-level controller, the method comprising:

receiving, via one or more of the turbine-level controllers, an indication of at least one of a communication loss between the turbine-level controllers and the farm-level controller, a detection of an absence of reactive power regulation by the farm-level controller, or a reactive power command of the farm-level controller being equal to or above a saturation threshold during transitioning between a baseline operational mode and a reactive power mode, the reactive power mode being characterized in that only reactive power is generated; and upon receipt of the indication, adjusting a reactive power response of one or more reactive power regulators of the turbine-level controllers so as to avoid an overshoot reactive power event or an undershoot reactive power event at the point of interconnection.

Clause 2. The method of clause 1, wherein adjusting the reactive power response of one or more reactive power regulators of the turbine-level controllers further comprises at least one of adjusting one or more gain of the one or more reactive power regulators or disabling a feed-forward function of the one or more reactive power regulators.

Clause 3. The method of any of the preceding clauses, wherein disabling the feed-forward function of the one or more reactive power regulators further comprises:
generating, via one or more of the turbine-level controllers, a disable signal for one or more converter controllers of the plurality of wind turbines to disable the feed-forward function; and
sending, via one or more of the turbine-level controllers, the disable signal to the one or more converter controllers to disable the feed-forward function.

Clause 4. The method of any of the preceding clauses, wherein the disable signal instructs the one or more converter controllers to slow down a reactive power response thereof by disabling a feed-forward branch of the one or more reactive power regulators, effectively providing a smooth reactive power response.

Clause 5. The method of any of the preceding clauses, wherein the disable signal comprises a Boolean signal, the method further comprising, upon receipt of the indication, setting the Boolean signal to set to a true status, wherein before receiving the indication, the Boolean signal is set to a false status.

Clause 6. The method of any of the preceding clauses, wherein the Boolean signal remains set to the true status for a predetermined time limit before automatically resetting to the false status.

Clause 7. The method of any of the preceding clauses, wherein the predetermined time limit is less than about 100 seconds.

Clause 8. The method of any of the preceding clauses, further comprising at least one of determining the communication loss by observing one or more reference communication updates via one or more of the turbine-level controllers and determining if the reactive power regulation in the farm-level controller is disabled or enabled by observing a validity of a reactive power command sent by the farm-level controller.

Clause 9. The method of any of the preceding clauses, further comprising determining whether the reactive power command of the farm-level controller is equal to or above the saturation threshold during transitioning between the baseline operational mode and the reactive power mode by comparing, via one or more of the turbine-level controllers, the reactive power command of the farm-level controller to a maximum available reactive power at one of the plurality of wind turbines.

Clause 10. The method of any of the preceding clauses, further comprising enabling, via one or more of the turbine-level controllers, the feed-forward function of the one or more reactive power regulators after at least one of the communication loss is restored, the reactive power regulation in the farm-level controller is enabled, or the reactive power command is less than the saturation threshold during transitioning between the baseline operational mode and the reactive power mode.

Clause 11. A system for controlling a wind farm having a plurality of wind turbines electrically connected to an electrical grid at a point of interconnection, the system comprising:
a farm-level controller;
a plurality of turbine-level controllers communicatively coupled to the farm-level controller, each of the plurality of turbine-level controllers comprising at least one processor, the at least one processor configured to perform operations, the operations comprising:
receiving, via one or more of the plurality of turbine-level controllers, an indication of at least one of a communication loss between one or more of the plurality of turbine-level controllers and the farm-level controller, a detection of an absence of reactive power regulation by the farm-level controller, or a reactive power command of the farm-level controller being equal to or above a saturation threshold during transitioning between a baseline operational mode and reactive power mode, the reactive power mode being characterized in that only reactive power is generate; and
upon receipt of the indication, adjusting a reactive power response of one or more reactive power regulators of one or more of the plurality of turbine-level controllers so as to avoid an overshoot reactive power event or an undershoot reactive power event at the point of interconnection.

Clause 12. The system of clause 11, wherein adjusting the reactive power response of one or more reactive power regulators of one or more of the plurality of turbine-level controllers further comprises at least one of adjusting one or more gain of the one or more reactive power regulators or disabling a feed-forward function of the one or more reactive power regulators.

Clause 13. The system of clauses 11-12, wherein disabling the feed-forward function of the one or more reactive power regulators further comprises:
generating, via one or more of the plurality of turbine-level controllers, a disable signal for one or more converter controllers of the plurality of wind turbines to disable the feed-forward function; and
sending, via one or more of the plurality of turbine-level controllers, the disable signal to the one or more converter controllers to disable the feed-forward function.

Clause 14. The system of clauses 11-13, wherein the disable signal instructs the one or more converter controllers to slow down a reactive power response thereof by disabling a feed-forward branch of the one or more reactive power regulators, effectively providing a smooth reactive power response.

Clause 15. The system of clauses 11-14, wherein the disable signal comprises a Boolean signal, the method further comprising, upon receipt of the indication, setting the Boolean signal to set to a true status, wherein before receiving the indication, the Boolean signal is set to a false status.

Clause 16. The system of clauses 11-15, wherein the Boolean signal remains set to the true status for a predetermined time limit before automatically resetting to the false status.

Clause 17. The system of clauses 11-16, wherein the predetermined time limit is less than about 100 seconds.

Clause 18. The system of clauses 11-17, wherein the operations further comprise at least one of determining the communication loss by observing one or more reference communication updates via one or more of the plurality of turbine-level controllers and determining if the reactive power regulation in the farm-level controller is disabled or enabled by observing a validity of a reactive power command sent by the farm-level controller.

Clause 19. The system of clauses 11-18, wherein the operations further comprise determining whether the reactive power command of the farm-level controller being equal to or above the saturation threshold by comparing, via one or more of the plurality of turbine-level controllers, the reactive power command of the farm-level controller to a maximum available reactive power.

Clause 20. The system of clauses 11-19, wherein the operations further comprise enabling, via one or more of the plurality of turbine-level controllers, the feed-forward function of the one or more reactive power regulators after at least one of the communication loss is restored, the reactive power regulation in the farm-level controller is enabled, or the reactive power command is less than the saturation threshold during transitioning between the baseline operational mode and the reactive power mode.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind farm having a plurality of wind turbines electrically connected to an electrical grid at a point of interconnection, the wind farm being controlled by a farm-level controller, each of the plurality of wind turbines having a turbine-level controller communicatively coupled to the farm-level controller, the method comprising:
   receiving, via one or more of the turbine-level controllers, an indication of at least one of a communication loss between the turbine-level controllers and the farm-level controller, a detection of an absence of reactive power regulation by the farm-level controller, or a reactive power command of the farm-level controller being equal to or above a saturation threshold during transitioning between a baseline operational mode and a reactive power mode, the reactive power mode being characterized in that only reactive power is generated; and
   upon receipt of the indication, adjusting a reactive power response of one or more reactive power regulators of the turbine-level controllers so as to avoid an overshoot reactive power event or an undershoot reactive power event at the point of interconnection.

2. The method of claim 1, wherein adjusting the reactive power response of one or more reactive power regulators of the turbine-level controllers further comprises at least one of adjusting one or more gain of the one or more reactive power regulators or disabling a feed-forward function of the one or more reactive power regulators.

3. The method of claim 2, wherein disabling the feed-forward function of the one or more reactive power regulators further comprises:
   generating, via one or more of the turbine-level controllers, a disable signal for one or more converter controllers of the plurality of wind turbines to disable the feed-forward function; and
   sending, via one or more of the turbine-level controllers, the disable signal to the one or more converter controllers to disable the feed-forward function.

4. The method of claim 3, wherein the disable signal instructs the one or more converter controllers to slow down a reactive power response thereof by disabling a feed-forward branch of the one or more reactive power regulators, effectively providing a smooth reactive power response.

5. The method of claim 3, wherein the disable signal comprises a Boolean signal, the method further comprising, upon receipt of the indication, setting the Boolean signal to set to a true status, wherein before receiving the indication, the Boolean signal is set to a false status.

6. The method of claim 5, wherein the Boolean signal remains set to the true status for a predetermined time limit before automatically resetting to the false status.

7. The method of claim 6, wherein the predetermined time limit is less than about 100 seconds.

8. The method of claim 2, further comprising enabling, via one or more of the turbine-level controllers, the feed-forward function of the one or more reactive power regulators after at least one of the communication loss is restored, the reactive power regulation in the farm-level controller is enabled, or the reactive power command is less than the saturation threshold during transitioning between the baseline operational mode and the reactive power mode.

9. The method of claim 1, further comprising at least one of determining the communication loss by observing one or more reference communication updates via one or more of the turbine-level controllers and determining if the reactive power regulation in the farm-level controller is disabled or enabled by observing a validity of a reactive power command sent by the farm-level controller.

10. The method of claim 1, further comprising determining whether the reactive power command of the farm-level controller is equal to or above the saturation threshold during transitioning between the baseline operational mode and the reactive power mode by comparing, via one or more of the turbine-level controllers, the reactive power command of the farm-level controller to a maximum available reactive power at one of the plurality of wind turbines.

11. A system for controlling a wind farm having a plurality of wind turbines electrically connected to an electrical grid at a point of interconnection, the system comprising:
   a farm-level controller;
   a plurality of turbine-level controllers communicatively coupled to the farm-level controller, each of the plurality of turbine-level controllers comprising at least one processor, the at least one processor configured to perform operations, the operations comprising:
      receiving, via one or more of the plurality of turbine-level controllers, an indication of at least one of a communication loss between one or more of the plurality of turbine-level controllers and the farm-level controller, a detection of an absence of reactive power regulation by the farm-level controller, or a reactive power command of the farm-level controller being equal to or above a saturation threshold during transitioning between a baseline operational mode and reactive power mode, the reactive power mode being characterized in that only reactive power is generate; and
      upon receipt of the indication, adjusting a reactive power response of one or more reactive power regulators of one or more of the plurality of turbine-level controllers so as to avoid an overshoot reactive power event or an undershoot reactive power event at the point of interconnection.

12. The system of claim 11, wherein adjusting the reactive power response of one or more reactive power regulators of one or more of the plurality of turbine-level controllers further comprises at least one of adjusting one or more gain of the one or more reactive power regulators or disabling a feed-forward function of the one or more reactive power regulators.

13. The system of claim 12, wherein disabling the feed-forward function of the one or more reactive power regulators further comprises:
generating, via one or more of the plurality of turbine-level controllers, a disable signal for one or more converter controllers of the plurality of wind turbines to disable the feed-forward function; and
sending, via one or more of the plurality of turbine-level controllers, the disable signal to the one or more converter controllers to disable the feed-forward function.

14. The system of claim 13, wherein the disable signal instructs the one or more converter controllers to slow down a reactive power response thereof by disabling a feed-forward branch of the one or more reactive power regulators, effectively providing a smooth reactive power response.

15. The system of claim 13, wherein the disable signal comprises a Boolean signal, the operations further comprising, upon receipt of the indication, setting the Boolean signal to set to a true status, wherein before receiving the indication, the Boolean signal is set to a false status.

16. The system of claim 15, wherein the Boolean signal remains set to the true status for a predetermined time limit before automatically resetting to the false status.

17. The system of claim 16, wherein the predetermined time limit is less than about 100 seconds.

18. The system of claim 12, wherein the operations further comprise enabling, via one or more of the plurality of turbine-level controllers, the feed-forward function of the one or more reactive power regulators after at least one of the communication loss is restored, the reactive power regulation in the farm-level controller is enabled, or the reactive power command is less than the saturation threshold during transitioning between the baseline operational mode and the reactive power mode.

19. The system of claim 11, wherein the operations further comprise at least one of determining the communication loss by observing one or more reference communication updates via one or more of the plurality of turbine-level controllers and determining if the reactive power regulation in the farm-level controller is disabled or enabled by observing a validity of a reactive power command sent by the farm-level controller.

20. The system of claim 11, wherein the operations further comprise determining whether the reactive power command of the farm-level controller being equal to or above the saturation threshold by comparing, via one or more of the plurality of turbine-level controllers, the reactive power command of the farm-level controller to a maximum available reactive power.

* * * * *